United States Patent [19]
Aronberg et al.

[11] Patent Number: 5,933,647
[45] Date of Patent: Aug. 3, 1999

[54] SYSTEM AND METHOD FOR SOFTWARE DISTRIBUTION AND DESKTOP MANAGEMENT IN A COMPUTER NETWORK ENVIRONMENT

[75] Inventors: David B. Aronberg, Nyack; Dov J. Goldman, White Plains; Peter A. Spiro, Rye, all of N.Y.

[73] Assignee: Cognet Corporation, Valhalla, N.Y.

[21] Appl. No.: 08/792,938

[22] Filed: Jan. 24, 1997

[51] Int. Cl.$^6$ .................................................. G06F 9/44
[52] U.S. Cl. .................................. 395/712; 395/200.51
[58] Field of Search .................................. 395/712, 651, 395/652, 653, 200.5, 200.51, 200.52

[56] References Cited

U.S. PATENT DOCUMENTS

| | | | |
|---|---|---|---|
| 4,974,149 | 11/1990 | Valenti | 395/200.47 |
| 5,008,814 | 4/1991 | Mathur | 395/200.51 |
| 5,155,847 | 10/1992 | Kirouac et al. | 395/200.51 |
| 5,247,683 | 9/1993 | Holmes et al. | 395/200.51 |
| 5,339,435 | 8/1994 | Lubkin et al. | 395/712 |
| 5,359,730 | 10/1994 | Marron | 395/712 |
| 5,367,686 | 11/1994 | Fisher et al. | 395/712 |
| 5,421,009 | 5/1995 | Platt | 395/200.51 |
| 5,440,739 | 8/1995 | Beck et al. | 395/200.51 |
| 5,473,772 | 12/1995 | Halliwell et al. | 395/712 |
| 5,495,610 | 2/1996 | Shing et al. | 395/200.51 |
| 5,555,416 | 9/1996 | Owens et al. | 395/712 |
| 5,586,304 | 12/1996 | Stupek, Jr. et al. | 395/712 |
| 5,666,501 | 9/1997 | Jones et al. | 395/200.52 |
| 5,684,952 | 11/1997 | Stein | 395/200.51 |
| 5,684,996 | 11/1997 | Westerholm et al. | 395/712 |
| 5,689,640 | 11/1997 | Okanoue | 395/200.51 |
| 5,715,462 | 2/1998 | Iwamoto et al. | 395/712 |
| 5,721,824 | 2/1998 | Taylor | 395/712 |
| 5,724,509 | 3/1998 | Starkweather | 395/200.5 |
| 5,742,829 | 4/1998 | Davis et al. | 395/712 |
| 5,752,042 | 5/1998 | Cole et al. | 395/712 |
| 5,761,512 | 6/1998 | Breslau et al. | 395/705 |
| 5,764,992 | 6/1998 | Kullick et al. | 395/712 |
| 5,784,563 | 7/1998 | Marshall et al. | 395/200.51 |
| 5,790,796 | 8/1998 | Sadowsky | 395/200.51 |
| 5,794,052 | 8/1998 | Harding | 395/712 |
| 5,805,897 | 9/1998 | Glowny | 395/712 |
| 5,828,887 | 10/1998 | Yeager et al. | 395/712 |

*Primary Examiner*—Eric W. Stamber
*Attorney, Agent, or Firm*—Arthur L. Plevy

[57] ABSTRACT

A system for distributing software in a customized configuration, to pre-selected computers in a network environment, includes a workstation running a console, a workstation running an agent, and a file server. The workstation running the console creates distribution control information which dictates how the software is distributed and to what agent based workstations under a given set of conditions. The distribution control information is stored on the file server where it is subsequently downloaded from by the agent based workstation which meets the conditions for a particular configuration of the software.

28 Claims, 13 Drawing Sheets

SYSTEM AND METHOD FOR SOFTWARE DISTRIBUTION AND DESKTOP MANAGEMENT IN A COMPUTER NETWORK ENVIRONMENT

FIELD OF THE INVENTION

The present invention is related to computer network systems and more particularly to a system for distributing software and managing desktops on computers on the network.

BACKGROUND OF THE INVENTION

A complete software distribution and desktop management system for computer networks requires features such as automatic profiling of applications, effortless distribution of software, mass customization of computers on the network, and total support for a Windows 95 or NT based operating system. Present software distribution and desktop management systems only provide some of these features and only to a certain extent. Some of these present software distribution products are: Microsoft Systems Management Server (SMS), Seagate's WinInstall, Symantec Norton Network Administrator Suite (NAS), McAfee Associates Saber LAN Workstation, Tangram AM/PM, and Novell Netware Navigator.

WinInstall provides a rigid framework for performing file distribution, allowing the user to perform only a limited set of tasks at predetermined times. The present invention provides a flexible, object-oriented framework, giving the user total control over what events will take place during a distribution, when they take place, and who they affect. The present invention's object-oriented design also results in an easily expandable, bug-free application.

WinInstall makes the user navigate through a series of confusing screens to perform different tasks. The present invention's main console screen allows the user to create jobs, schedule them, and view the results all from one main view.

WinInstall is designed to provide file distribution only. The present invention goes beyond file distribution and is designed to allow custom configuration of each workstation or group of workstations from the administrator's console.

Many Windows' applications make use of the same components such as ".dll" files. If application "A" installs component "X", application "B", installed after "A", will not copy "X" to the hard drive again. To solve this problem, the documentation for WinInstall recommends that the user profile an application using a "fresh" copy of Windows. WinInstall does nothing to enforce this requirement or to automatically satisfy it. By contrast, the present invention downgrades the Windows environment on the administrator's PC so that it is "fresh" before starting an application installation. Every single package is profiled perfectly, whether or not the administrator is aware of this crucial problem.

The present invention affords many options during a software distribution that WinInstall does not. For example, the present invention provides the capability to delete files, remove directories, create empty directories, perform search-and-replace on multiple files, and kick off executables at any time during an installation.

The present invention provides a graphical interface for viewing and modifying changes to the registry giving the administrator complete control over the registry, including the ability to delete keys and values. WinInstall does not.

The present invention provides a sophisticated graphical condition expression builder to allow distributions based on any combination of several criteria, including user name, group membership, hard disk size, free disk space, and environment variables. Moreover, the present invention has the ability to vary an installation at distribution time based on any of the above criteria. WinInstall and Symantec do not.

The present invention's condition expression builder can be applied to any individual component action of a distribution. This allows a network administrator to customize individual aspects of a particular application with ease. WinInstall and Symantec have no similar ability.

The present invention offers complete control of Windows configuration files, i.e., "ini files", including the ability to add or remove lines, or pieces of text within a line, to or from any section. WinInstall does not offer this flexibility.

The present invention provides the ability to call administrator-defined subroutines to perform common tasks, such as virus-checking or cleaning files from the hard drive, before, during, or after a software distribution. WinInstall and Symantec do not.

The present invention "Profiles" user applications for the administrator, creating all the instructions and commands necessary to distribute the software automatically. Symantec Norton Administrator Suite forces the user to create instructions and commands manually.

Symantec Norton Administrator Suite permits the user to schedule jobs based on user name, group membership and workstation. In contrast, the present invention permits the administrator, i.e., user, to schedule jobs based on many more criteria, including workstation characteristics, and how much free disk space will be left after an installation.

The present invention can automatically profile and distribute any Windows application. Microsoft SMS requires that the application have a special script file to guide the installation process.

Microsoft SMS can schedule any executable to run on a group of workstations. However, the present invention can not only schedule an executable, but also any action in its database to run at the workstation.

Accordingly, it is an object of the present invention to provide a complete software distribution and desktop management system for a computer network environment. It is a further object of the present invention to provide a software distribution and desktop management system with full integration into a graphical user interface based operating system.

SUMMARY OF THE INVENTION

The present invention is a system for distribution of a software in a customized configuration to a computer in network environment. The system includes a console means for creating distribution control information which is both associated with said software and related to said customized configuration. A server means responsive to the console means stores the software and the distribution control information. Linked to the server means is an agent means for downloading the software from the server means, in accordance with the distribution control information. The agent means resides on the computer which downloads the software. Preferably, the console means, agent means and server means are each a computer with a Windows 95 or NT based operating system.

The distribution control information created by the console means includes a profile which instructs the computer running the agent on how to install the software onto itself. The console means further includes a virgin windows process for assuring that a windows based operating system within the console means does not conflict with said profile set up on the console means. The virgin windows process includes copying a file from the current windows directory on the console means onto a backup directory.

The distribution control information includes a condition expression builder which controls which computer should install the software onto itself from the file server. The condition may be based on the name of the computer running the agent, a group membership of the computer running the agent, or hard disk capacity of the computer running the agent.

BRIEF DESCRIPTION OF THE DRAWINGS

The invention will be better understood with reference to the following illustrative and non-limiting drawings, wherein like features are like numbered throughout the drawings, in which.

DETAILED DESCRIPTION OF THE INVENTION

Although the present invention can be used in many different computer network environments where a complete software distribution and management solution is useful, the present invention as described herein is especially suited for use in a graphical user interface based operating system. Accordingly, the present invention will be described in conjunction with a Windows 95 or NT operating system based computer network environment.

A complete software distribution and desktop management system for computer networks requires features such as automatic profiling of applications, effortless distribution of software, mass customization of computers on the network, and total support for the operating system such as Windows 95 and Windows NT.

Figure 1:
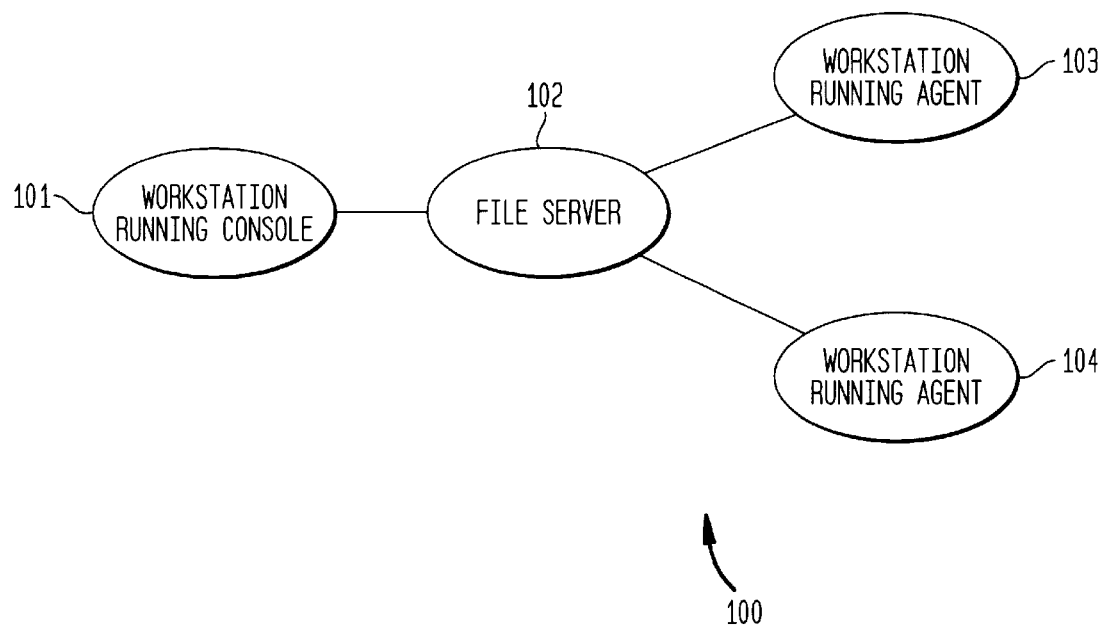
FIG. 1 is a system overview schematic of the present invention.

Referring now to FIG. 1 there is shown a system overview schematic 100 of a typical network arrangement in accordance with the present invention. Software distribution and desktop management is performed from the workstation running the console 101 component of the present invention which includes an administrator. The workstation running the console 101 is linked to the file server 102 which in turn is linked to workstations 103 and 104 running the agent components of the present invention. It is noted that in the present invention the profiling occurs on the console 101, the profile is stored on the file server 102, and the profile is distributed to the agents 103 and 104. The profile is a set of instructions to the computers 103 and 104 on how to install any application.

Figure 2:
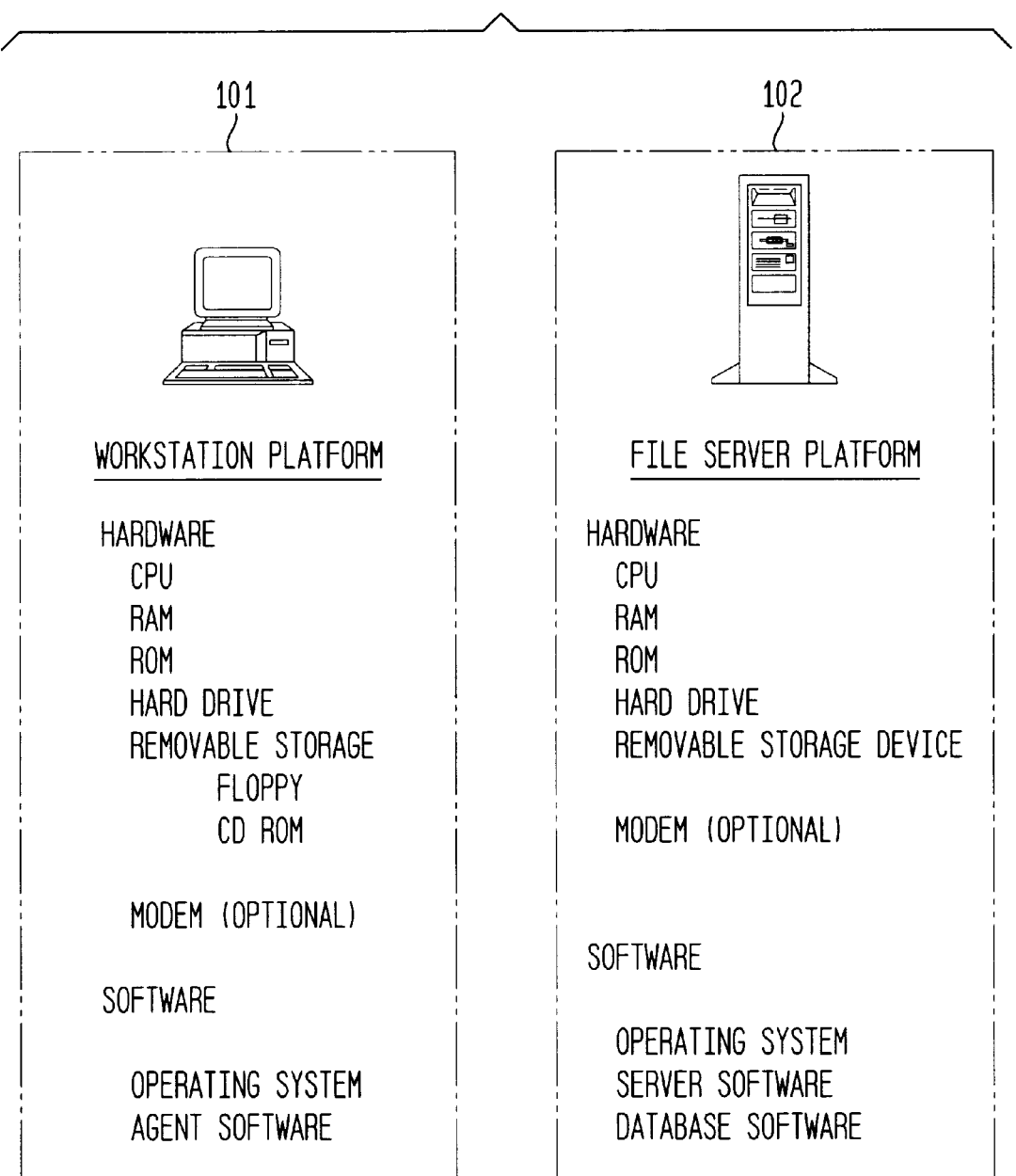
FIG. 2 is a schematic of the hardware and software platforms for the present invention.

Referring now to FIG. 2, there is shown a display of typical hardware elements for a workstation and a file server, and respective software elements which configure the hardware elements for operation in accordance with the present invention. A typical workstation platform, running the console or agent, includes hardware such as a central processing unit (CPU), e.g. a Pentium microprocessor, RAM, ROM, hard drive storage, modem, and optional removable storage devices such as a floppy drive or a CD ROM drive. The workstation hardware is configured by software including an operating system, e.g., Windows 95 or NT, networking software, and either the console or agent software components. The functionality of the console and agent software is defined in more detail by the remaining figures and the discussion thereto. A typical server platform includes hardware such as a CPU, e.g., Pentium microprocessor, RAM, ROM, hard drive, modem, and optional removable storage devices, e.g., floppy or CD ROM drive. The server hardware is configured by software including an operating system, e.g., Windows 95 or NT, networking software, and database software.

The software distribution process is controlled by the administrator which profiles an application. The profile is stored in a database on the file server 102. The administrator schedules a distribution of the application, i.e., profile, using the scheduler, and specifies which agent based workstations 103 or 104 should receive the application using a condition builder. Each agent 103,104 detects a newly scheduled application, and evaluates the condition for distribution to see if the distribution to it is appropriate. If the distribution is appropriate for a particular agent, that agent pulls down the distribution, i.e., the agent performs the actual distribution. If the distribution is not appropriate for a particular agent, then that agent goes back to sleep, i.e., does not perform a distribution.

The condition builder aspect of the present invention entails selection of a criteria, specifying a value for this criteria by requiring the user at the administrator, i.e., console 101, to type in the criteria or by browsing for the criteria. The user at the administrator has the ability to build more complex conditions by adding more criteria.

A profile or application is made up of individual "actions". The user may edit the action, edit the condition attached to the action, delete the action, or perform a "search and replace" on the action. A key feature of the present invention is the ability to produce "gender neutral profiles" which means that after an application is profiled, the application can be distributed automatically to Windows NT workstation, Windows 95 workstation, and if its a 16 bit application to a Windows 3.1 workstation.

Concerning the grouping the action sets, applications, or profiles, there are the following four types of action sets: folders, application, routines, and install types. Folders hold other actions sets, but contain no actions. Routines contain only actions. Install types contain only actions. An application contains actions and other install types.

Figure 3:
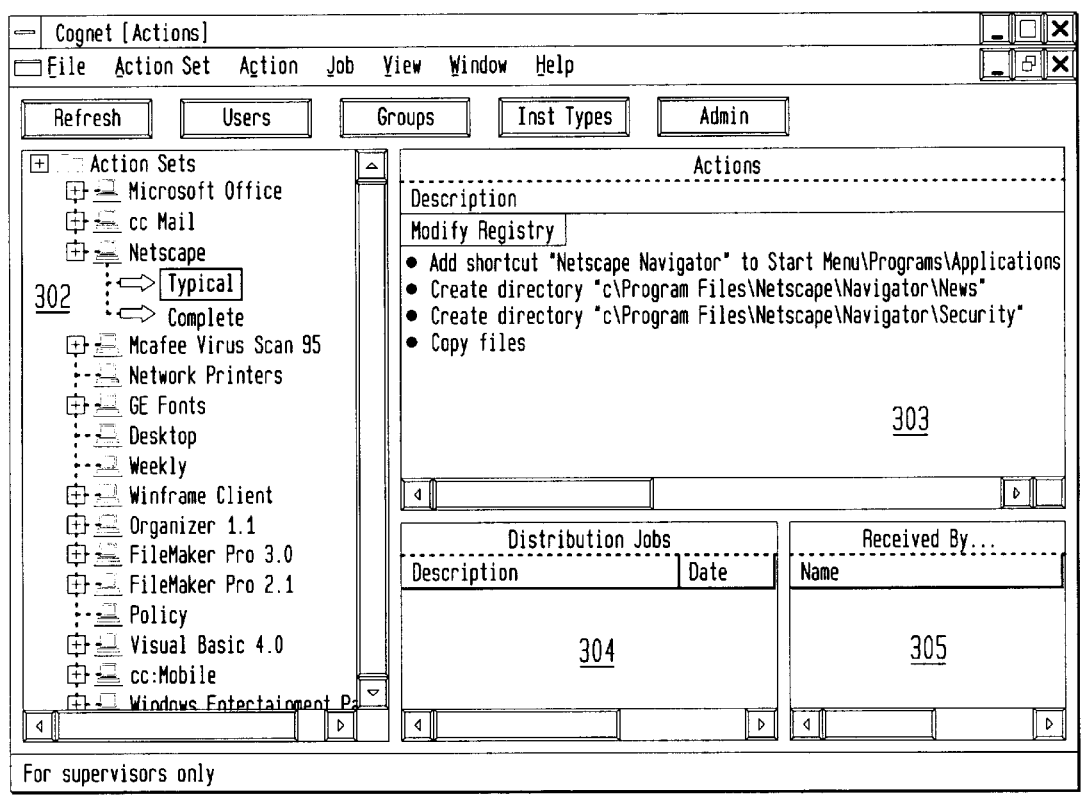
FIG. 3 shows a main window through which the present invention is controlled from the workstation running the console.

Referring now to FIG. 3 there is shown a main window 301 through which the present invention is controlled from the workstation running the console. The various actions sets 302 are selected by clicking on a particular application and choosing an install type. Particular actions available to the user are described in a boxed area 303. The distribution of the jobs and the agents to receive the jobs are noted in boxed areas 304 and 305, respectively.

Figure 4:
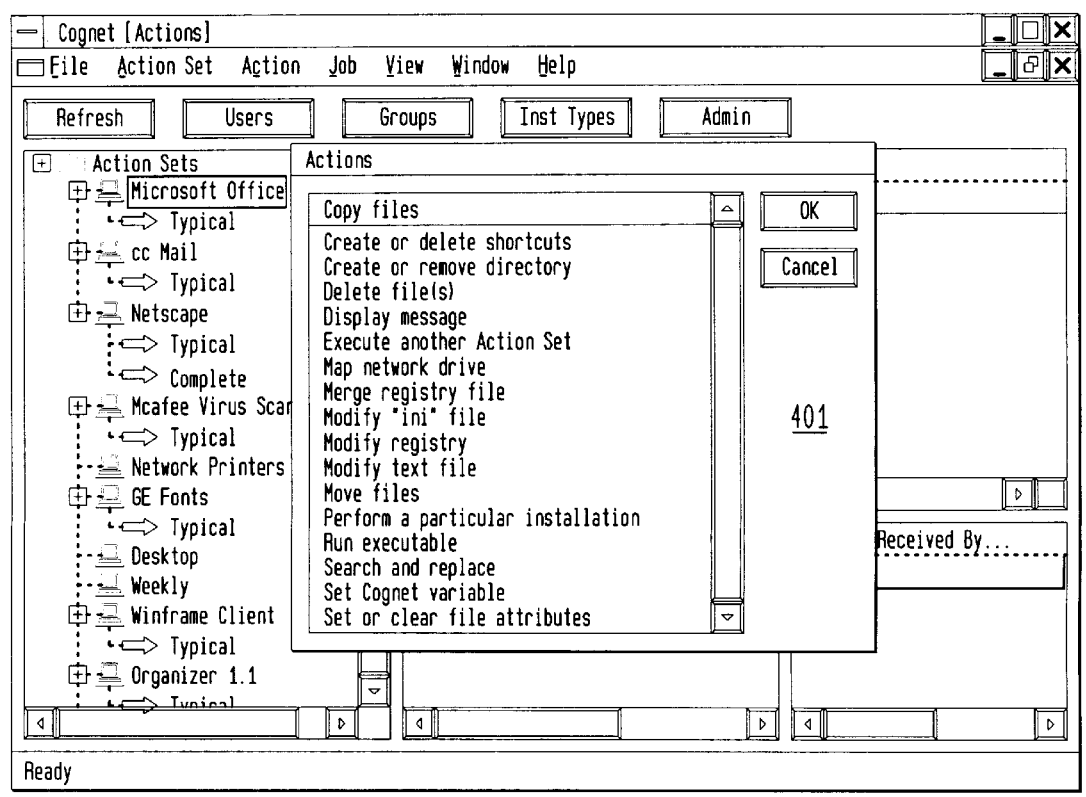
FIG. 4 shows a dialog box, accessed from the window in FIG. 3, from which actions by the user are selected.

Referring now to FIG. 4 there is shown a dialog box 401, accessed from the main window in FIG. 3, from which actions by the user are selected. As shown, the application Microsoft Office is selected with a typical install option, and various actions which the user may select by clicking the mouse controlled cursor on the particular action desired. As noted before, actions are instructions that will be executed by the agent based workstation, such as 103 or 104, when the agent determines it meets the conditions set by the administrator from the console and pulls down the application from the file server 102. After the profiler has created the predetermined set of actions, the user can add more actions to customize the download of the application to the agents. The user may add a new action to an action set by selecting one from the list in the dialog box 401.

Figure 5:
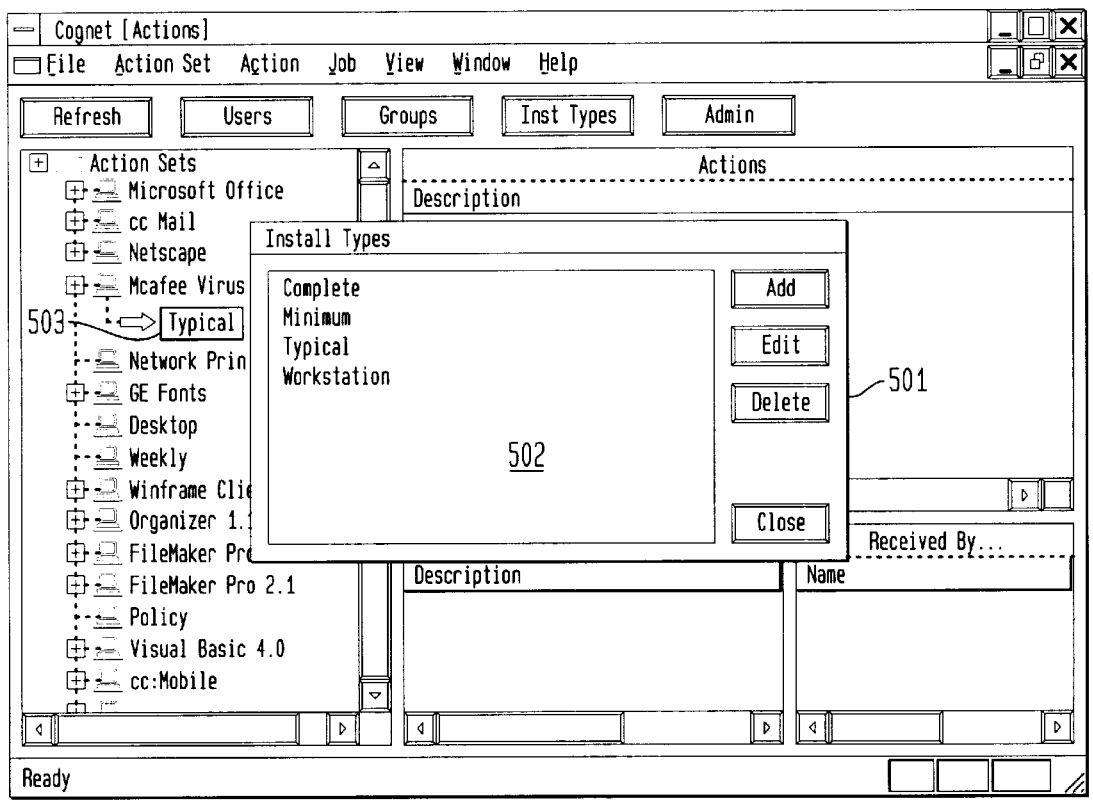
FIG. 5 shows a dialog box, accessed from the window in FIG. 3, from which an install type is selected by the user.

Referring now to FIG. 5 there is shown a dialog box 501, accessed from the window in FIG. 3, from which an install type 502 is selected by the user. As shown for the Mcafee Virus application, double clicking on the typical selection 503 prompts the present invention to display the dialog box 501. The install types are related to different installation types available with the particular application, e.g., Microsoft Office has install options depending on user hardware capacity such as hard drive storage or RAM capacity.

Figure 6:
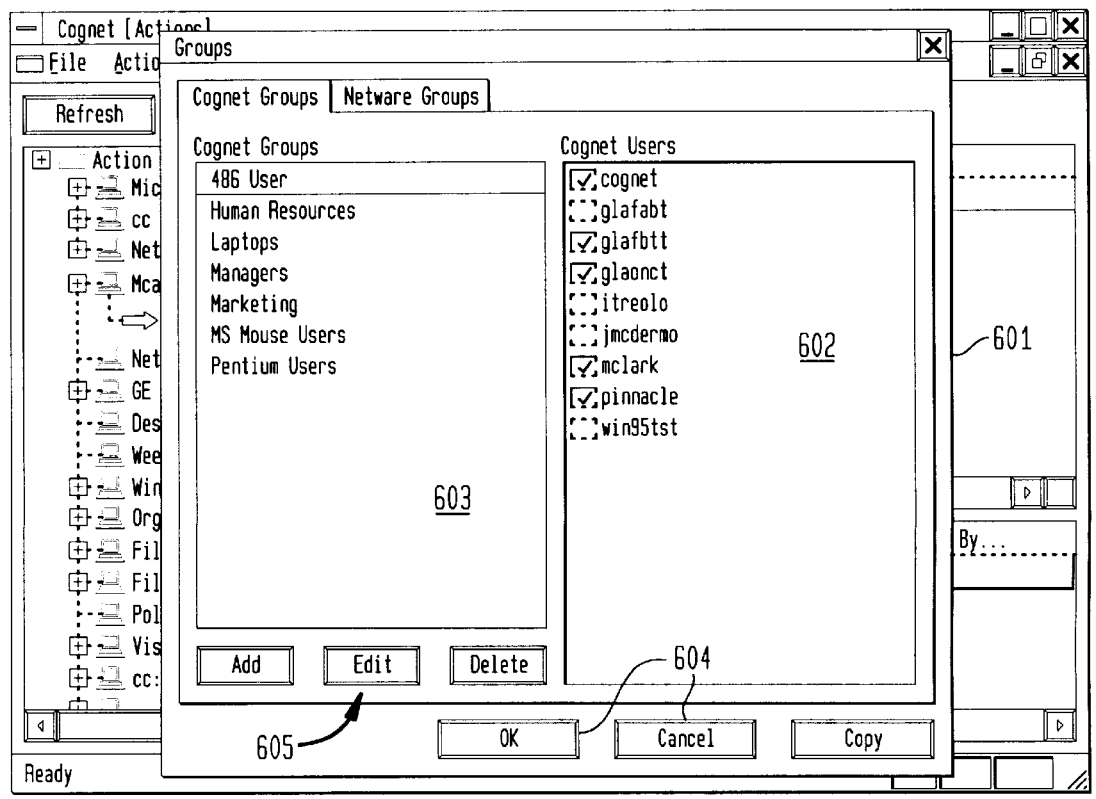
FIG. 6 shows a dialog box, accessed from the window of FIG. 3, from which group selections are made by the user.

Referring now to FIG. 6 there is shown a dialog box 601, accessed from the window of FIG. 3, from which group selections are made by the user. All groups of agents are listed in boxed area 603. The current selected group, shown as 486 Users, is indicated by a dark highlighting. All agents within a particular group are listed in boxed area 602. A check mark next to a particular agent indicates that the agent is a member of the particular group highlighted. A group is added, selected or deleted from the cluster of buttons 605. The dialog box 601 is closed by clicking the bottom buttons 604. Note that groups are generally set up for security or privilege purposes. The present invention allows set up of groups to also group distribution of applications, i.e., marketing group users, financial group users, engineering group users, etc. Also, groups can be set up strictly for distribution purposes within the network environment operating under the present invention.

Figure 7:
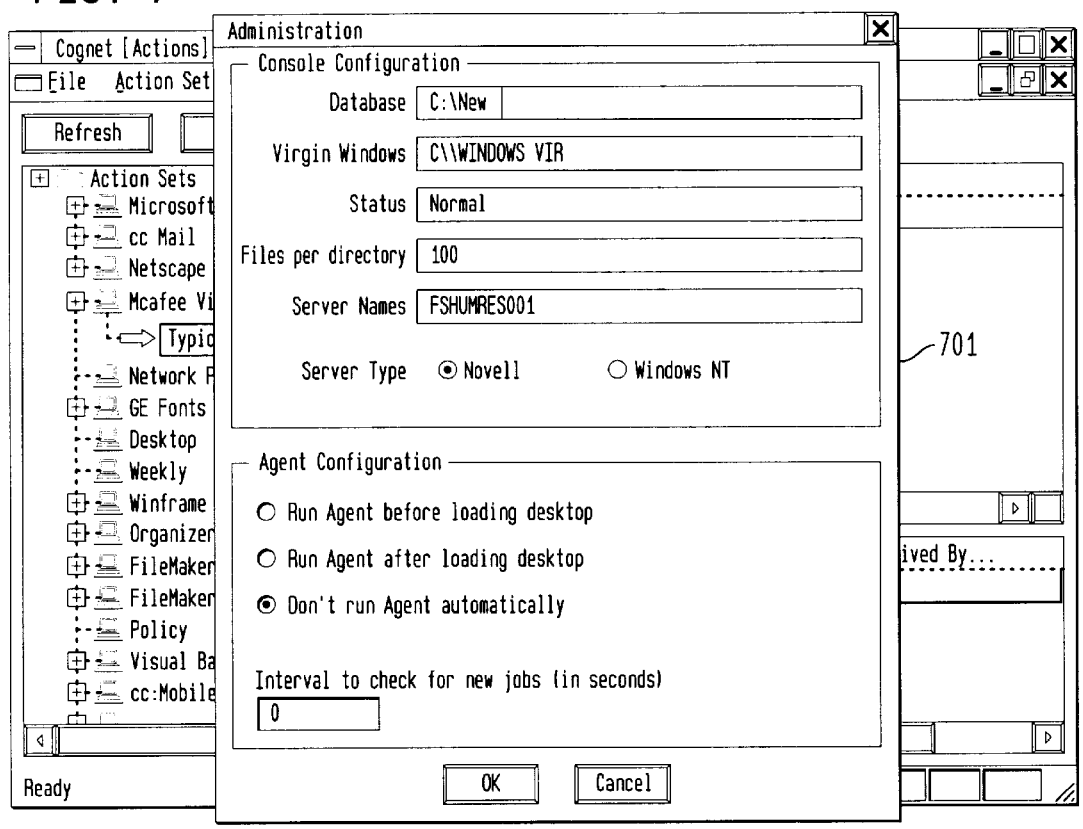
FIG. 7 shows a dialog box, accessed from the window of FIG. 3, from which administration properties are selected by the user.

Referring now to FIG. 7 there is shown a dialog box 701, accessed from the main window of FIG. 3, from which administration properties are displayed and selected by the user. The console configuration properties include database location, virgin windows location (described in more detail later herein), status, files per directory, server name, and file type. The agent configuration properties include running the agent before or after loading the desktop or not running the agent automatically.

Figure 8:
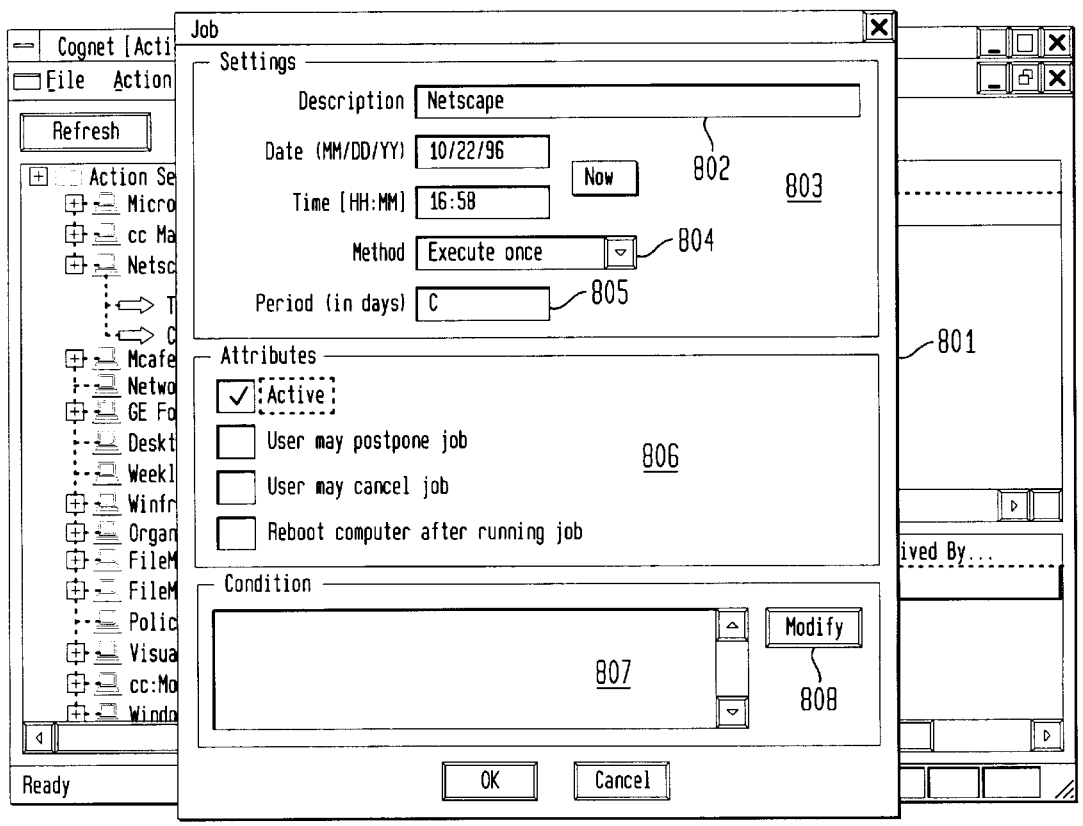
FIG. 8 shows a dialog box, accessed from the window of FIG. 3, from which scheduling related properties are selected by the user.

Referring now to FIG. 8 there is shown a dialog box 801, accessed from the main window of FIG. 3, from which scheduling related properties are selected by the user. Properties selected by the user are job description 802, the date and time that the job will execute 803, the method of execution 804 which may be once or periodic, and how often for a periodic method 805. Job attributes 806 include active, postponement, cancellation and rebooting the computer after the job is run. The condition criteria for the software distribution is shown in block area 807. The modify button 808 is clicked to prompt the system to display a dialog box 901 shown in FIG. 9.

Figure 9:
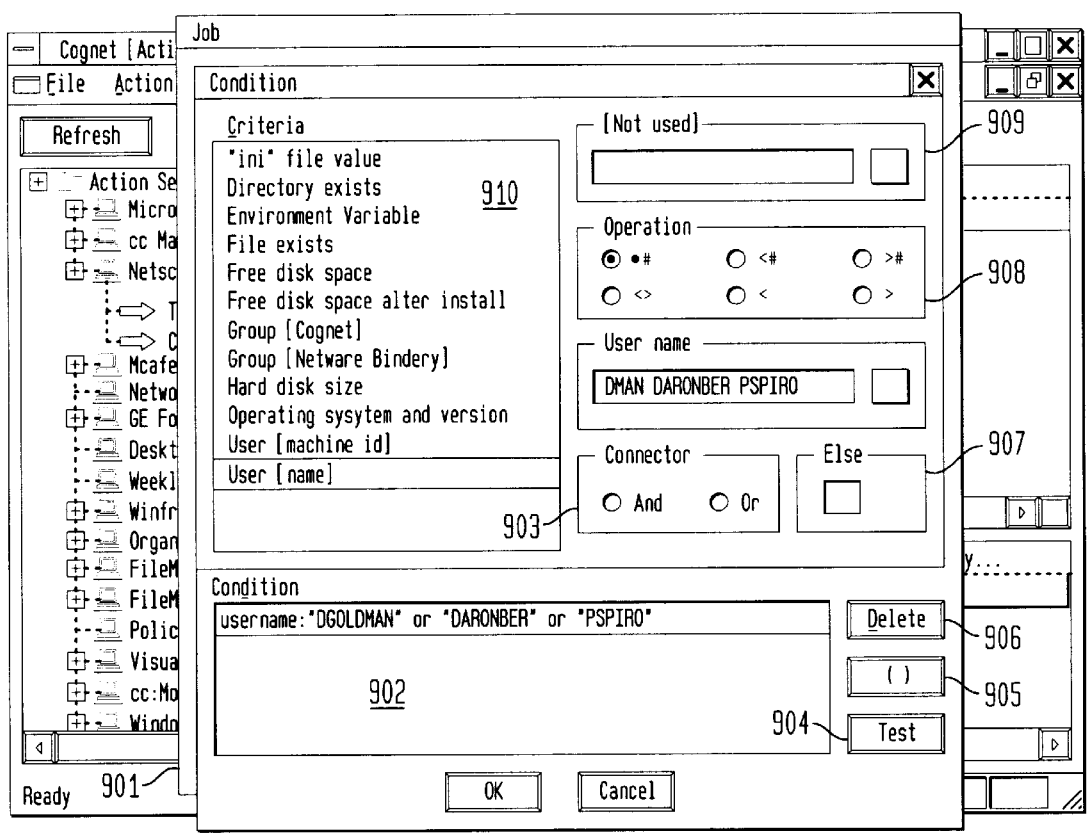
FIG. 9 shows a dialog box, accessible from the dialog box in FIG. 8, from which condition related selections are made by the user.

As shown in FIG. 9, the condition builder feature allows user at the console to control what conditions a particular agent must meet to pull down the application from the file server. The dialog box 901 permits the user to add a condition to the job, or modify an existing condition. The selected criteria 902 which make up the condition are shown in boxed area 902. The connector selection 903 allows the user to connect up criteria in the condition. The test button 904 permits evaluation of the condition and displays the results. The parenthesize feature 905 allows the user to selectively group criteria within the condition. The delete button 906 permits deletion of criteria from a condition. The else feature 907 permits the user to link the entire condition with the previous condition. The operation features 908 permit the user to modify the selected criteria. The entry field and lookup button 909 is used to modify the selected criteria. Lastly, the available criteria the user may select from is displayed in the boxed area 910.

Figure 10:
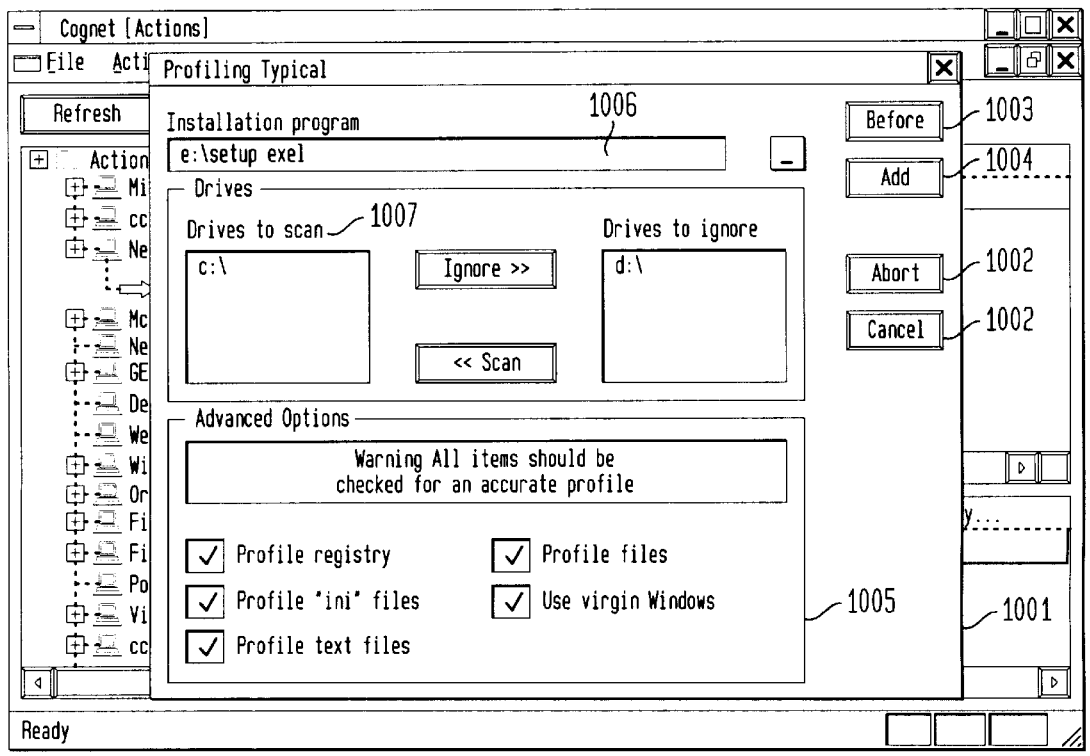
FIG. 10 shows a dialog box, accessed from the window of FIG. 3, from which profiling selections are made by the user.

Referring now to FIG. 10 there is shown a profiling dialog box 1001, accessed from the window of FIG. 3, for a typical configuration by the user. The dialog box shows the name 1006 of the set up program that will install the application being profiled. The "drives to scan" display 1007 shows all drives which may be affected by the installation. The user at the console based workstation has profiling options 1005. Buttons 1002, 1003, and 1004 allow the user abort, begin and continue the profiling process, respectively.

Figure 11:
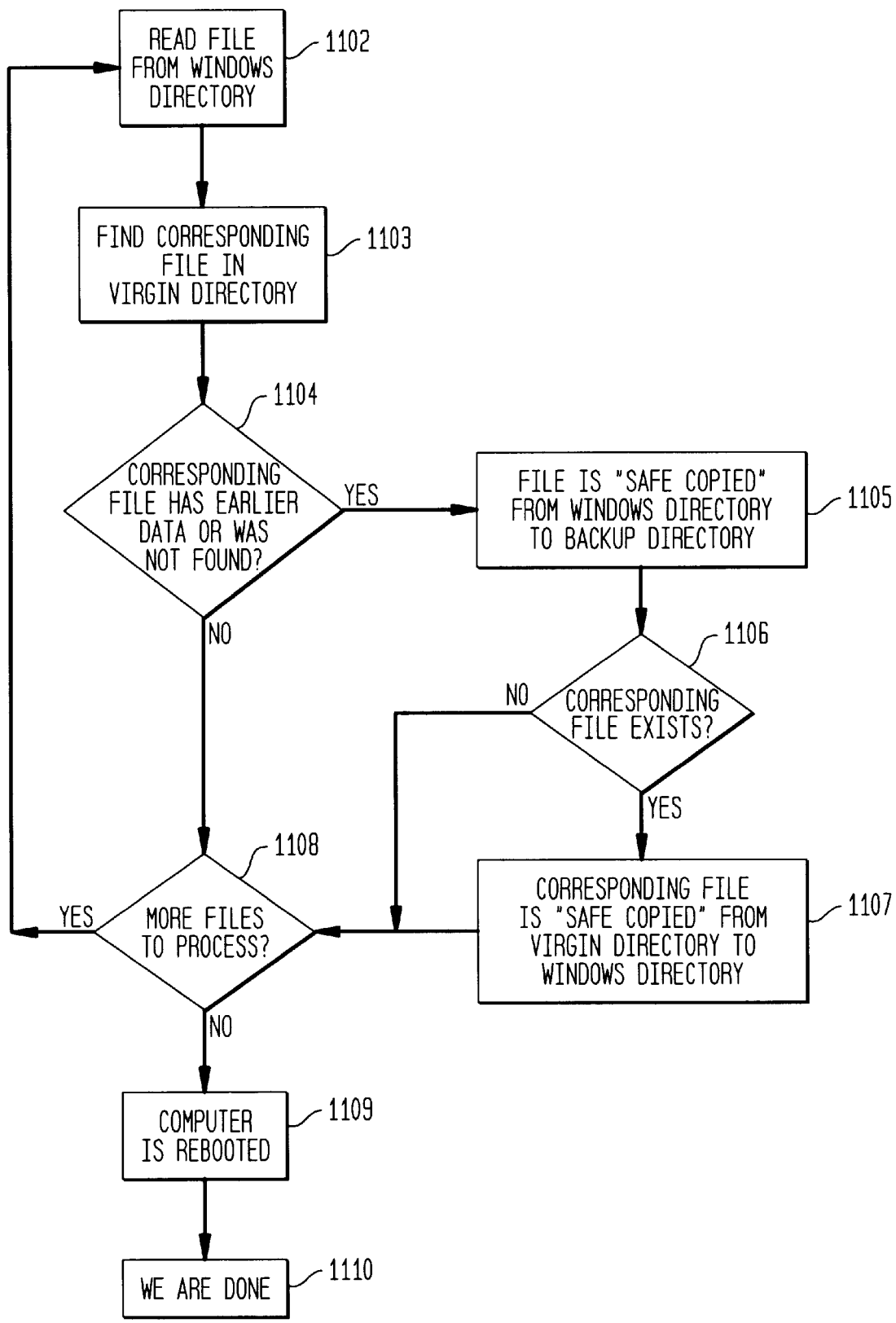
FIG. 11 is a schematic of the "Virgin Windows" process in accordance with the present invention.

Referring now to FIG. 11 there is shown a schematic 1101 of the "Virgin Windows" process in accordance with the present invention. Since the profiling process takes place at the console based workstation, which administrates the software distribution and desktop management of the agent based workstations, the virgin windows process assures that the console based workstation's windows operating system will not conflict with the profiles set up by the administrator. The administrator has to set up all files with the application on its workstation. In other words, the application is set up on the administration workstation, and the virgin windows process assures there are no conflicts with the workstation's current system and software configuration. After the system downloads the application with the profile to the file sever, the application is removed from the administration workstation.

First, the virgin windows process begins with a read from the file directory 1102, then the corresponding file is found in the virgin directory 1103. If the corresponding file has an earlier date or was not found 1104, the file is "safe copied"

to a backup directory 1105. If the corresponding file exists 1106, the corresponding file is safe copied from the virgin windows directory to the windows directory 1107. Note that the "safe copied" feature is detailed in FIG. 17 and the discussion thereto. If more files are to be processed 1108 the system starts back from process stage 1102, otherwise, the computer is rebooted 1109 and the virgin windows process is completed 1110.

Figure 12:
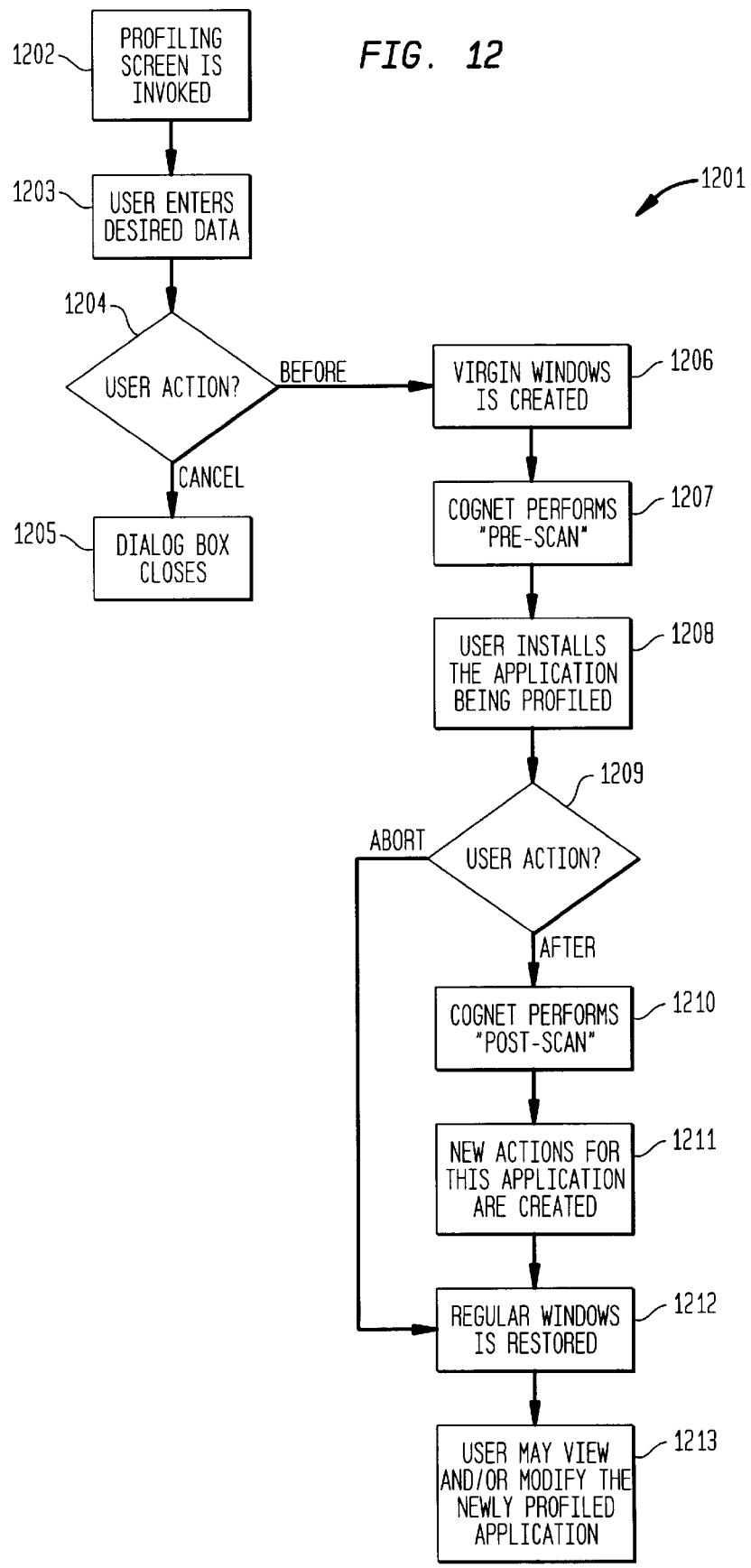
FIG. 12 is a schematic of the profiling process in accordance with the present invention.

Referring now to FIG. 12 there is shown a schematic 1201 of the profiling process in accordance with the present invention. First, the profiling screen is invoked 1202, then the user enters the desired data 1203. The system then requires user action 1204 to either prompt the system to perform the virgin windows process or cancel the operation and close the dialog box 1205. If the virgin windows process is selected a virgin windows is created 1206, the system performs a "pre-scan" 1207, and the user installs the application being profiled 1208. Note that for a "pre-scan" the system reads the entire registry for temporary storage, copies all .ini, .bat and .sys files from the windows directory to a temporary storage location, scans the entire hard disk, then stores the following information for each file: name, size and time.

The system then requires user action to either abort the process or perform further processing. If the user aborts, the regular windows is restored, but the user may not view or modify the newly profiled application, because there is no newly modified application (it was aborted). If further processing is selected, the system performs the post-scan, regular windows is restored, and then the user may modify the newly profiled application.

THE PRE-SCAN PROCESS

During the pre-scan:

The system scans the entire registry, and creates a list of all entries and values.

The system scans all files on the hard drive and creates a list specifying the name, date, time, and size of each file.

The system backs up the autoexec.bat file, the config.sys file, and all ".ini" files in the Windows directory.

THE POST SCAN PROCESS

During the post-scan:

The system scans the entire registry. For each entry in the registry, it looks for a corresponding entry in the copy of the registry that was saved during the pre-scan. If no corresponding entry is found, or if the entry has changed, we know this is a new registry entry and the system adds it to the profile.

The system scans all files on the disk. For each file, it looks to see if that file is stored in the list that was created during the pre-scan. If not, or if the date, time, or size of the file has changed since the pre-scan, the system adds this file to the profile. The system examines the autoexec.bat, config.sys, and all ".ini" files in the Window directory. For each of these files, it compares the file to a copy of the file that was saved during the pre-scan. If the file has changed, the new text, i.e. the changes in these files, are added to the profile. If the user selects to abort, the regular windows is restored 1212 and the user may view or modify the newly profiled application 1213. If further processing is selected, the system performs a post-scan 1210, new actions for the application are created 1211, followed by a restoration of the regular main window 1212. Note that a post scan involves profiling the registry, .ini files, .text files, and files on the hard disk.

Figure 13:
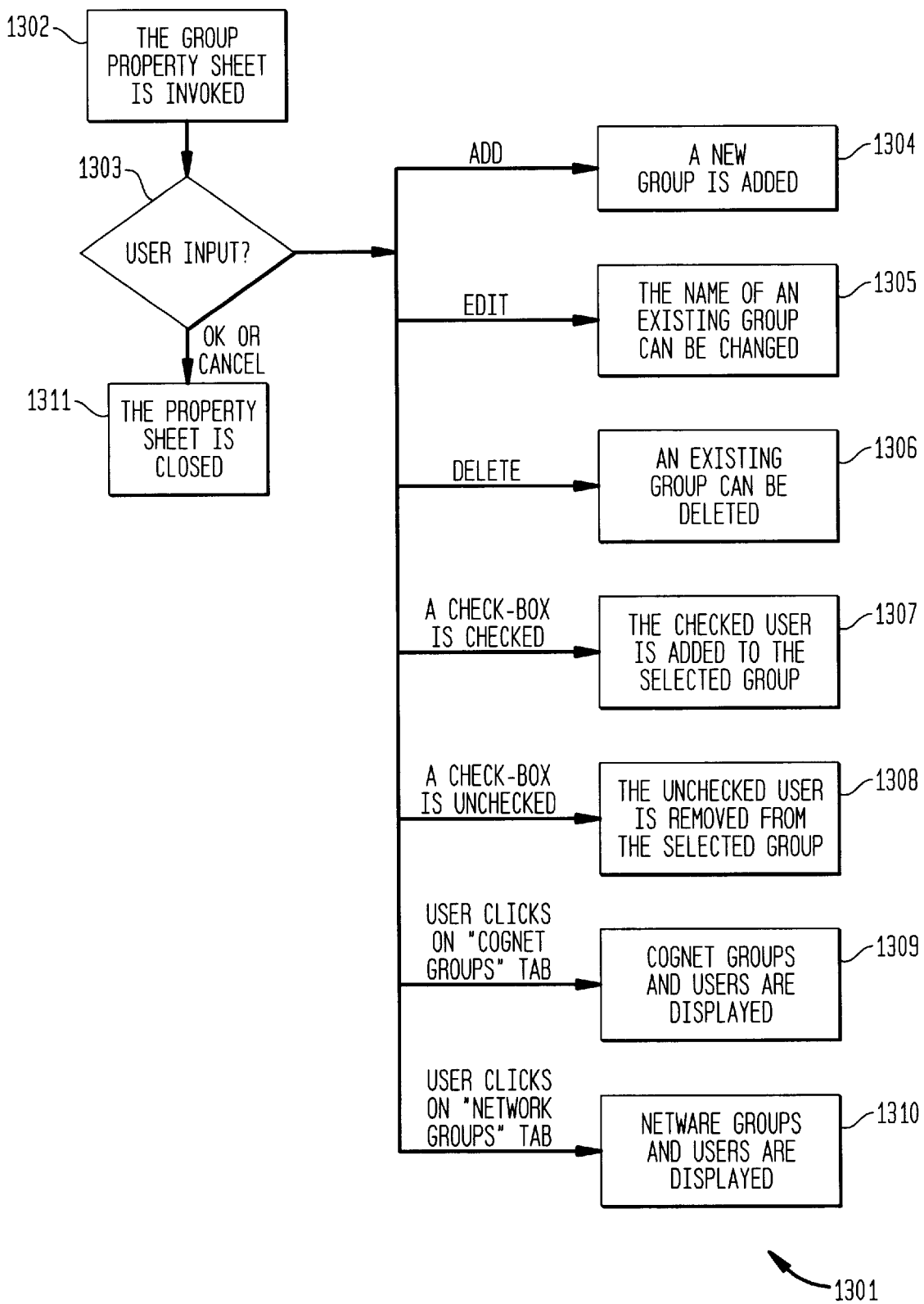
FIG. 13 is a schematic of the process, accessed from the dialog box of FIG. 6, for administration of users or groups.

Referring now to FIG. 13, there is shown a schematic 1301 of the process, accessed from the dialog box of FIG. 6, for administration of users or groups. Initially, the groups property window of FIG. 6 is invoked 1302, followed by one of the following user inputs: "Add", "Edit", "Delete", "checkbox is checked", "check-box is unchecked", "Cognet groups", and "Netware groups". With an "Add" user input a new group is created 1304. For an "Edit" user input, the name of an existing group can be changed 1305. Making a "Delete" user causes an existing group to be deleted 1306. Checking the check-box causes the checked user to be added to the selected group 1307. Leaving the check-box unchecked causes the unchecked user to be removed from the selected group 1308. Clicking on the "Cognet Groups" tab causes the groups and users to be displayed 1309. Lastly for a click on the "Netware Groups" tab, the Netware groups and users are displayed 1310. When the user selects "OK" or "cancel" the groups property window is closed 1311.

Figure 14:
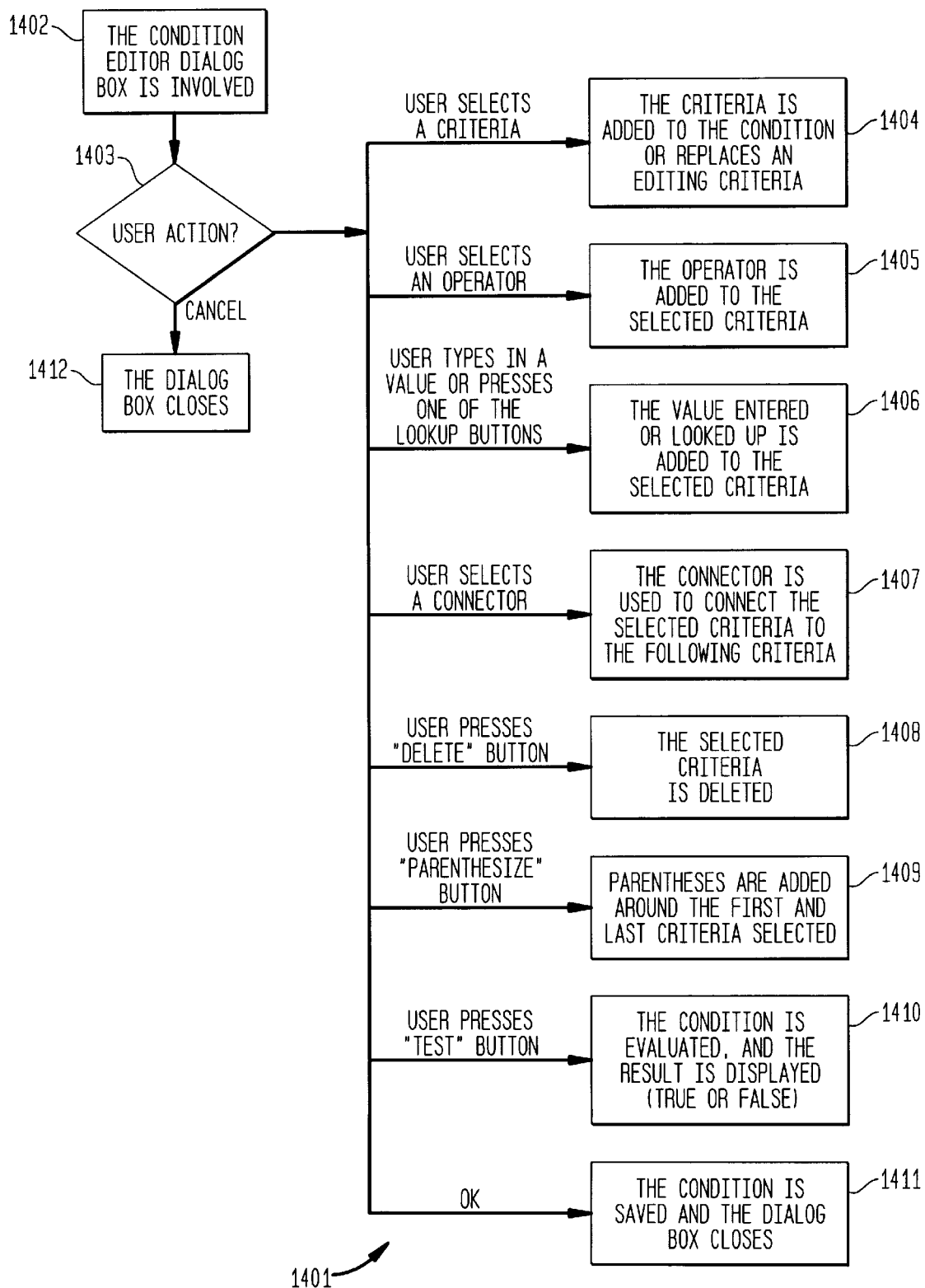
FIG. 14 is a schematic of the condition building process, controlled from the dialog box of FIG. 9, in accordance with the present invention.

Referring now to FIG. 14, there is shown a schematic 1401 of the condition building process, controlled from the dialog box of FIG. 9. Initially, the condition editor window 807 is invoked 1402. User action 1403 either closes the dialog box 1412, or takes one of eight options. The user may select a criteria wherein the criteria is added to the condition, or replaces an existing criteria 1404. The user may select an operator which is added to the selected criteria 1405. The user may type in a value or press one of the lookup tabs which is added to the selected criteria 1406. The user may select a connector which is used to connect the selected criteria to the following criteria 1407. The user may delete the selected criteria 1408. The user may use the "parenthesize" button whereby parentheses are added around the first and last criteria selected 1409. The test option may be selected whereby the condition is evaluated and the result is displayed as either true or false 1410. Lastly, the user may opt to save the condition and close the dialog box 1412.

Figure 15:
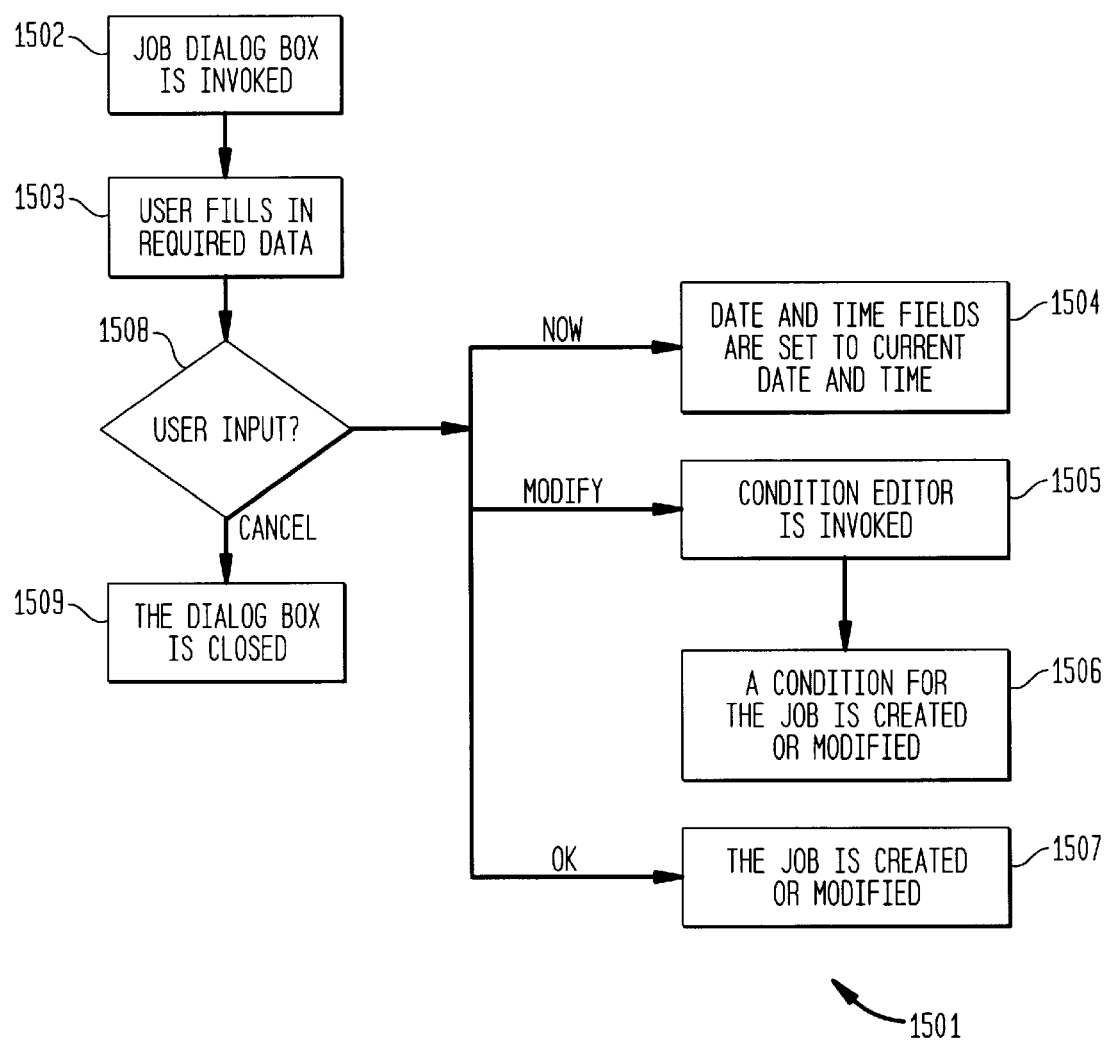
FIG. 15 is a schematic of the scheduling process, controlled from the Dialog box in FIG. 8, in accordance with the present invention.

Referring now to FIG. 15, there is shown a schematic 1501 of the scheduling process, controlled from the Dialog box in FIG. 8. Initially, the dialog window 801 is invoked 1502, followed by the user filling in the required data 1503. User input may be any of the following: set the current date and time, 1504, invoke the condition editor 1505 to modify or create a condition for the job, or create or modify a job 1507. Otherwise, the dialog box is closed 1509.

Figure 16:
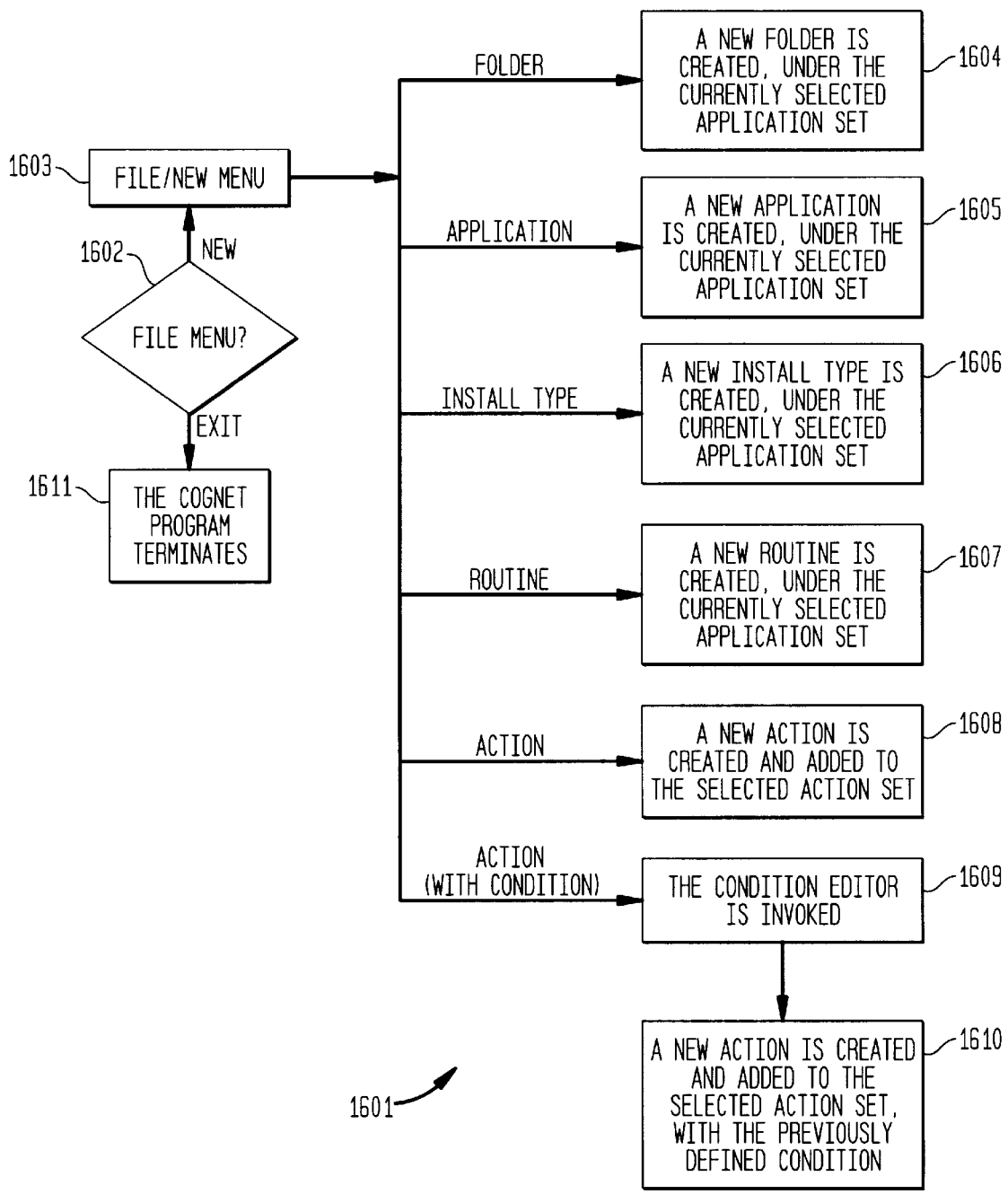
FIG. 16 is a schematic of the file menu properties in accordance with the present invention.

Referring now to FIG. 16 there is shown a schematic 1601 of the file menu properties in accordance with the present invention. The user, through the file menu 1602, may select a new "file/new menu" 1603 which pertains to a folder, application, "Install type", routine, action or action with a condition. Under a current Application set, a new folder 1604, application 1605, "Install type" 1606, or routine 1607 may be created. A new action is created and added to a selected action set. For an action with a condition, the condition editor is invoked 1609, and a new action is created and added to the selected action set with the previously defined condition 1610. Upon exiting the file menu 1602, the system terminates the program 1611.

Figure 17:
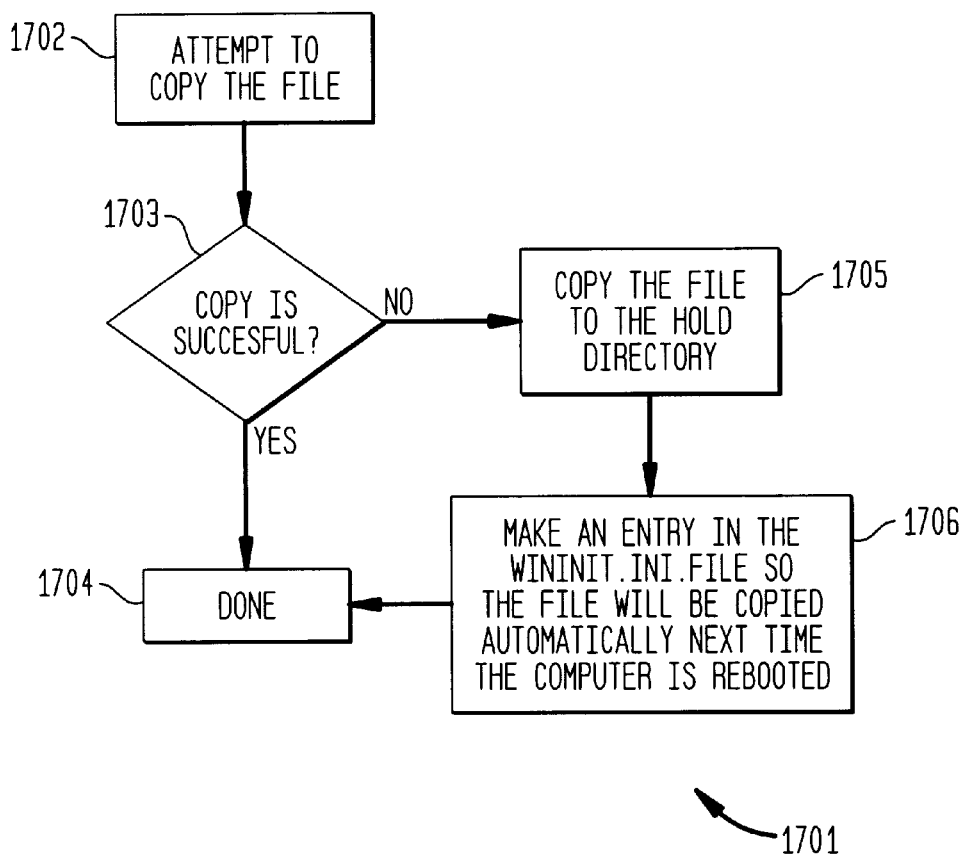
FIG. 17 is a schematic of a safe copy process in accordance with the present invention.

Referring now to FIG. 17 there shown a schematic 1701 of a safe copy process which is called up at points 1105 and 1107 of the "Virgin Windows" process. Upon an attempt to copy the selected file 1702, when the copy is not successful, the file is copied to the hold directory 1705, an entry is made in a "wininit.ini" file so that the file will be copied automatically next time the computer is rebooted 1706, and the process is done 1704.

Figure 18:
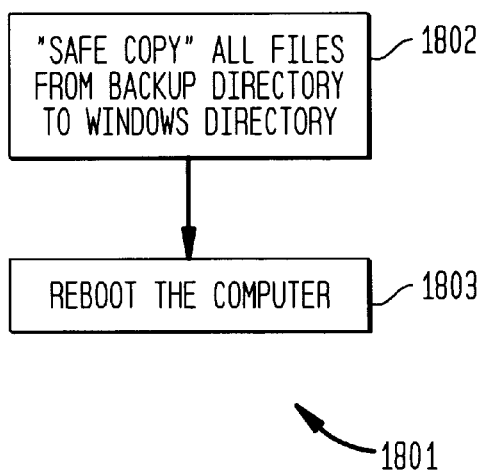
FIG. 18 is chart for the process to restore the regular windows during the scheduling process of FIG. 12.

Referring to FIG. 18, the chart 1801 shows that for restoring the regular windows during the scheduling process at point 1212 in FIG. 12, the files are safe copied from the backup directory to the Windows directory 1802 and the computer is rebooted 1803.

In this system one has the ability to create a "system variable". This is a variable to which the administrator can attach several possible values, each with a separate condition (which is created using the Condition Builder). Then, when the agent executes the distribution, the system variable takes on the value associated with the condition that evaluates to "true." For example, one could create a system variable called "dataDir." And one could attach two values to this variable, "c:\data", and "f\data". And to each of these values, one could attach a separate condition, such as "User is member of group 'laptop'." Now, one can use this variable throughout the application (i.e. profile); for example, one could use it to create an empty directory, or as a destination for copying files. When the agent runs this distribution, it will evaluate the conditions and use the appropriate value for the variable. This is a capability that no other software distribution package offers.

The system also provides the ability to set up multiple "install types." Each install type is one possible way of installing an application. For example, the "complete" install type may install an application with all possible option, and the "typical" install type would install an application with only the most common options. After setting up the install types, the administrator has the ability to attach logic, via the condition builder, to each one. For example, a condition might be "if free disk space>=100 megs, then perform the "complete" install type, otherwise, perform the "typical" install type." This logic is evaluated at each workstation by the agent, so each user gets the appropriate install type, depending on how much free disk space they have.

It should be understood that the embodiment described herein is merely exemplary and that a person skilled in the art may make many variations and modifications to these embodiments utilizing functionally equivalent elements to those described herein. For example, the file server is discussed above as a distinct computer device in the network environment, however, the file server can readily reside in a secondary hard drive storage device with its own operating system on the console workstation. Any and all such variations or modifications as well as others which may become apparent to those skilled in the art, are intended to be included within the scope of the invention as defined by the appended claims.

What is claimed is:

1. A system for distributing software in a customized configuration to a computer coupled to a computer network comprising:
   console means for:
      creating distribution control information which includes a profile which instructs said computer on how to install said software onto said computer, and is both associated with said software and related to said customized configuration, and,
      a virgin process for assuring that an operating system operating on said console means does not conflict with said profile set up on said console means;
   server means responsive to said console means for storing said software and said distribution control information; and,
   agent means for downloading said software in accordance with said distribution control information, said agent means residing on said computer.

2. The system in accordance with claim 1, wherein said console means is a computer with one of a Windows 95 and Windows NT based operating system.

3. The system in accordance with claim 1, wherein said agent means is a computer with one of a Windows 95 and Windows NT based operating system.

4. The system in accordance with claim 1, wherein said server means is a computer with one of a Windows 95 and Windows NT based operating system.

5. The system in accordance with claim 1, wherein said virgin process includes copying a file from a current operating directory on said console means onto a backup directory.

6. The system in accordance with claim 1, further comprising a remaining plurality of computers also coupled to said computer network, wherein said distribution control information includes a condition expression builder which controls which of said computer and said remaining plurality of computers said software should be distributed to.

7. The system in accordance with claim 6 wherein said condition builder is dependent upon at least one of a name associated with said computer or one of said plurality of computers, a group membership of said computer or one of said plurality of computers, and hard disk capacity of said computer or one of said plurality of computers.

8. A system for a customized distribution of a software in a computer network environment, comprising:
   a console based workstation, within said computer network environment, which administers said customized distribution of said software throughout said computer network environment, provides a profile which instructs said agent based workstation on how to install said software onto said agent based workstation in a customized configuration, and is configured for a virgin process which assures that an operating system within said console based workstation does not conflict with said profile set up on said console based workstation;
   a file server, within said computer network environment, which receives said software and information related to a configuration of said software for said customized distribution; and
   an agent based workstation, within said computer network environment, which retrieves from said file server said software in accordance with said configuration of said software as determined by said console based workstation.

9. The system in accordance with claim 8, wherein said console based workstation is a computer with one of a Windows 95 and Windows NT based operating system.

10. The system in accordance with claim 8, wherein said agent based workstation is a computer with one of a Windows 95 and Windows NT based operating system.

11. The system in accordance with claim 8, wherein said file server is a computer with one of a Windows 95 and Windows NT based operating system.

12. The system in accordance with claim 8, wherein said virgin process includes copying a file from a predetermined directory on said console means onto a backup directory.

13. The system in accordance with claim 8, further comprising a plurality of agent based workstations, wherein said console based workstation is configured to utilize a condition expression builder which controls which of said plurality of said agent based workstations should receive said software.

14. The system in accordance with claim 13, wherein said expression builder is dependent upon at least one of a name of said agent based workstation or one of said plurality of agent based workstations, a group membership of said agent based workstation or one of said plurality of agent based workstations, and hard disk capacity of said agent based workstation or one of said plurality of agent based workstations.

15. A method for distributing software to a target computer having a customized configuration and coupled to a computer network, said method comprising the steps of:

creating distribution control information which is both associated with said software and related to said customized configuration of said target computer using an administrator computer utilizing a configuration different from said customized configuration of said target computer;

storing said software and said distribution control information; and downloading said software in accordance with said distribution control information to said target computer, wherein initialization of said downloading is performed by said target computer.

16. The method in accordance with claim 15, wherein said step of creating distribution control information includes creating a profile which instructs said computer on how to install said software onto said computer.

17. The method in accordance with claim 15, further comprising the step of assuring that for a console computer where administration of said step of creating distribution control information takes place, there is no conflict with the operating system on said console computer with said profile set up on said console computer.

18. The method in accordance with claim 17, wherein said step of assuring includes copying a file from the current windows directory on said console computer onto a backup directory.

19. The method in accordance with claim 15, wherein a plurality of computers are in said network environment, and further comprising the step of conditioning which of said plurality of computers will perform said step of downloading said software.

20. The method in accordance with claim 19, wherein said step of conditioning selects at least one of said computer and said plurality of computers to perform said step of downloading based on at least one of a name of said computer or one of said plurality of computers, a group membership of said computer or one of said plurality of computers, and hard disk capacity of said computer or one of said plurality of computers.

21. A method for remotely installing software to a select group of a plurality of computers, wherein each of said plurality of computers is respectively coupled to a same computer network and at least one of said plurality of computers is operative to serve as an administrator workstation which, in a first mode, utilizes a first configuration indicative of a base configuration which has been modified to permit at least one installed software package to be executed, said method comprising the steps of:

initializing said administrator workstation in a second mode utilizing said base configuration;

installing at least one software application on said administrator workstation while said administrator workstation is operating in said second mode, resulting in changes being made to said base configuration;

determining said changes made to said base configuration resulting from said step of installing said at least one software application on said administrator workstation;

generating a sequence of steps capable of reproducing said determined changes on any of said plurality of computers; and, selectively executing at least some of said sequence of steps on each of said select group of said plurality of computers according to a preexisting configuration associated with each of said select group of said plurality of computers, wherein said preexisting configuration may be different for each of said select group of said plurality of computers.

22. The method of claim 21, further comprising the step of building a contingency expression which is utilized to automatically define said select group of said plurality of computers.

23. The method of claim 21, further comprising the step of undoing each of said changes made to said base configuration.

24. The method of claim 21, wherein said step of initializing said administrator workstation in said second mode comprises the steps of:

copying a plurality of files from at least one predetermined location and associated with said first mode to a first backup directory; and, copying a plurality of files associated with said second mode from a second backup directory to said at least one predetermined location.

25. A method for selectively distributing software to at least one of a plurality of computers coupled to a same network, wherein each of said plurality of computers is respectively operable in a first mode which utilizes an associated configuration indicative of a base configuration which has been modified so previously installed software packages can be executed on it, said method comprising the steps of:

initializing a first of said plurality of computers in a second mode which utilizes said base configuration;

installing a target software package on said first computer resulting in changes being made to said base configuration of said first computer;

ascertaining said changes made to said base configuration of said first computer;

selecting at least some of said ascertained changes to duplicate on a second computer selected from said plurality of computers dependent upon said associated configuration of said second computer; and, effecting said selected changes on said second computer, thus installing said target software on said second computer in a manner customized for said second computer regardless of said associated configuration of said first computer.

26. The method of claim 25, further comprising the step of building a contingency expression which is utilized to automatically identify at least said second computer.

27. The method of claim 25, further comprising the step of undoing each of said changes made to said base configuration of said first computer.

28. The method of claim 25, wherein said step of initializing said first computer in said second mode comprises the steps of:

copying a plurality of files from at least one predetermined location and associated with said first mode to a first backup directory; and, copying a plurality of files associated with said second mode from a second backup directory to said at least one predetermined location.

* * * * *